Oct. 3, 1961 G. STAVIS 3,003,117
COINCIDENT FREQUENCY TRACKER
Filed Sept. 29, 1959 2 Sheets-Sheet 1

INVENTOR.
GUS STAVIS
BY
ATTORNEY.

Oct. 3, 1961  G. STAVIS  3,003,117
COINCIDENT FREQUENCY TRACKER
Filed Sept. 29, 1959  2 Sheets-Sheet 2

INVENTOR.
GUS STAVIS

BY

ATTORNEY.

United States Patent Office 3,003,117
Patented Oct. 3, 1961

3,003,117
COINCIDENT FREQUENCY TRACKER
Gus Stavis, Briarcliff Manor, N.Y., assignor to General Precision, Inc., a corporation of Delaware
Filed Sept. 29, 1959, Ser. No. 843,237
9 Claims. (Cl. 331—14)

This invention relates to automatic signal frequency trackers employing resonant discriminators and more particularly to such trackers containing band-pass filters.

Frequency trackers are required in instruments utilizing the Doppler difference frequencies of microwave echo signals to yield various kinds of information such as speed and drift of a vehicle carrying the instrumentality. The frequency spectrum of such an echo fluctuates, making special apparatus necessary to track and measure the fluctuating center frequency of the spectrum. Such special apparatus is termed a frequency tracker.

A resonant frequency tracker includes a mixing modulator to which the Doppler difference signal spectrum is introduced. A heterodyning signal is also applied to the modulator, and the resulting side bands are applied to a discriminator which includes a filter or other resonant element. The discriminator error output signal is integrated to secure a control signal which is made to control the frequency of the heterodyning signal in such a way as to reduce the error signal to zero.

In one commonly-used form of frequency tracker the filter has a narrow transmission band, and the two signals applied to it have much wider spectra. The spectra of these signals intersect at a "crossover" frequency, and are adjusted so that the crossover frequency is exactly at the center of the transmission band of the band-pass filter. When this is accomplished the frequency tracker loop error signal falls to zero and the loop is said to be balanced or nulled.

When the band-pass filter has a symmetrical frequency-transmission characteristic, and in the absence of filter characteristic drift with time or temperature, the filter position is an accurate measure of the crossover point of the spectra. If, however, the filter has an asymmetrical characteristic or its characteristic drifts with time and temperature the frequency tracker operation is inaccurate. Since the manufacture of suitable filters on a production basis is quite difficult, the attainment and maintenance of the required frequency tracker accuracy has been a difficult practical problem.

The circuits of this invention eliminate inaccuracies due to these two causes, filter asymmetry and drift. They do this by reversing, in a frequency sense, one of the two spectra applied to the filter, moving the spectra together until one is superimposed on the other, and placing the filter characteristic part way down one side of the composite Doppler spectrum. Loop balance is achieved when exact superimposition is indicated by equality of the energies of the two spectra transmitted by the filter. In this method of sensing, the shape of the filter characteristic does not affect the accuracy of frequency tracking, nor is accuracy affected by a moderate amount of drift due to filter instability with temperature or time.

The present invention has the advantage of simplicity over previous circuits attaining the same result. It provides a resonant filter which is adjustable over the input Doppler signal frequency band. The heterodyne signal generator is adjusted, when the loop is balanced, to twice the Doppler signal frequency, so that the difference side band frequency is equal to the Doppler frequency. These two signals are introduced to the filter on a time-shared basis. At null, the spectra of these two signals are exactly superimposed, so that the error signal derived from the differential filter transmission signal falls to zero. Error sensing is secured by offsetting the filter transmission band slightly from the centers of the superimposed applied spectra.

The purpose of this invention is to provide a resonant discriminator frequency tracker free from errors caused by filter asymmetry and drift.

More specifically, the purpose of this invention is to provide a frequency tracker which balances its loop by superimposing a derived Doppler spectrum upon the Doppler spectrum itself and by employing a resonant filter transmission band slightly offset from the superimposed spectra median frequency to sense the amount and direction of superimposition error.

A fuller understanding of the invention may be secured from the detailed description and drawings, in which.

Figure 1:
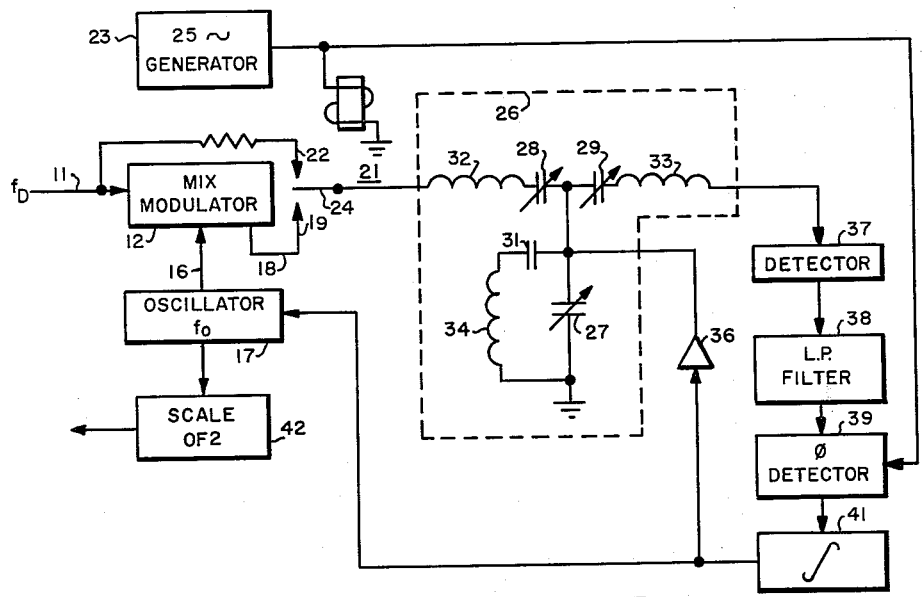
FIGURE 1 is the schematic circuit of an embodiment of the invention.
Figure 2:
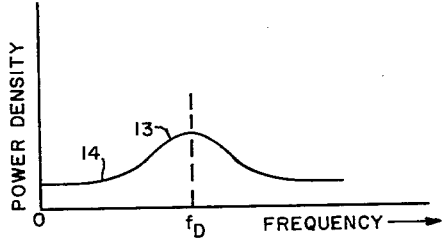
FIGURE 2 is a graph of the Doppler input signal applied to the frequency tracker.

Referring now to FIG. 1, a signal to be frequency tracked is applied at the input 11 of a balanced mixer modulator 12. The signal to be tracked has the usual characteristics of Doppler echo signals. Its frequency characteristic as illustrated in FIG. 2, consists of a wideband spectrum having a center frequency $f_D$, the bandwidth some 16% of its center frequency. The form approximates the Gaussian. The spectrum 13 rises from a noise level represented by the horizontal power density 14. The spectrum 13 may move up or down in frequency at a fairly rapid rate, and it is the function of a frequency tracker to maintain constant measurement of the center frequency, $f_D$, even during such frequency movements. The range of frequency change may be, for example, between 2 and 20 kilocycles per second.

Again referring to FIG. 1, the mixer modulator 12 receives a heterodyning signal from an oscillator 17 at a second input 16, this heterodyning signal having a frequency $f_0$. The balanced mixer modulator emits upper and lower frequency side bands at output conductor 18 which is connected to one contact 19 of a switch 21. The Doppler input conductor 11 is connected directly to the other contact 22. The switch 21 is operated at a frequency preferably not greater than 100 c.p.s., for example, 25 c.p.s., by a switching generator 23. The output from the switch arm 24 is applied to an adjustable band pass filter 26.

This filter is preferably of the kind in which adjustment is accomplished by adjusting the capacitances. A convenient form of adjustable capacitance employs a semiconductor junction the capacitance of which is sensitive to an applied direct potential. Such a voltage-sensitive variable capacitor is made, for example, by International Rectifier Corp., 1521 E. Grand Ave., El Segundo, Calif. Capacitors 27, 28 and 29 are of this type. Capacitor 31, of much larger capacitance, is non-adjustable and is merely for the purpose of coupling. Inductors 32, 33 and 34 complete the filter. It is adjustable by the application of direct potential across capacitors 27, 28 and 29 from the output of a direct-current amplifier 36. The filter is capable of adjustment over at least the Doppler range.

The output of filter 26 is demodulated in an amplitude detector 37. If the loop is not at its balance null the detector 37 will have a 25 c.p.s. output. This output may be filtered in a low-pass filter 38 passing 25 c.p.s., then phase-detected in a phase detector 39 supplied with a 25 c.p.s. phase reference potential from the switching generator 23. The output of the phase detector 39 is integrated in integrator 41, the output of which is in turn applied to control the frequency $f_0$ of oscillator 17.

The output of integrator 41 is also applied as the input of the direct-current amplifier 36. The output of oscillator 17 is halved in frequency in a scale-of-two circuit 42 the output of which, having a frequency at loop balance equal to the Doppler input signal central frequency, is the frequency tracker output.

Figure 3:
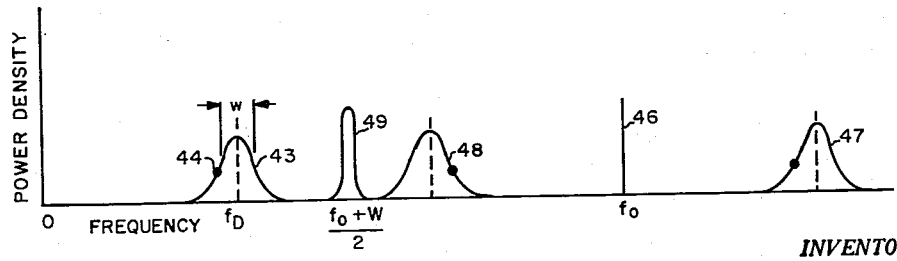
FIGURES 3, 4, 5 and 6 are graphs illustrating the principles of operation of the invention.

In the operation of this circuit, the spectrum of applied Doppler frequencies is ideally represented at 43 in FIG. 3, having a spectral central frequency $f_D$ and a frequency bandwidth of $w$ between 3 db points. The two skirts of the spectral form are distinguished by the dot, 44, placed on the lower-frequency side. The frequency, $f_0$, of the oscillator 17 is represented by the line 46, here placed for clarity considerably higher than the Doppler frequency. When $f_D$ and $f_0$ are intermodulated the resulting sum and difference frequencies are represented by the spectra 47 and 48, respectively, and the spectral sides analogous to the lower-frequency side 44 of the Doppler spectrum 43 are identified by dots. The transmission band of band-pass filter 26 is depicted by the waveform 49. This filter is adjusted so that its center frequency is $\frac{1}{2}f_0 + \frac{1}{2}w$.

Figure 4:
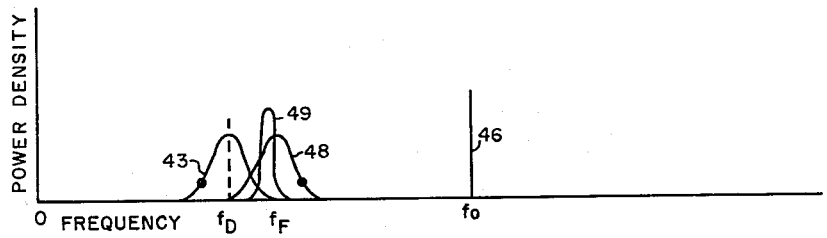

In the acquisition of a signal the oscillator frequency line 46 is moved downward until it is approximately at twice the Doppler frequency. The lower intermodulation product side band, 48, then will intersect the Doppler spectrum, 43, as shown in FIG. 4, and the filter transmission band 49, located at frequency $f_F$, still related to the oscillator frequency $f_0$ by an amount determined by the expression $$f_F = \frac{f_0 + w}{2} \qquad (1)$$

intersects both spectra. When the switch arm 24 makes contact with its fixed contact 19, the spectrum 48 is applied to the filter 26 and an amplitude is transmitted through the filter proportional to the intersection in FIG. 4 of the spectrum 48 with the filter band 49. When the switch arm 24 makes contact with its other fixed contact, 22, the Doppler spectrum 43 is applied to the filter and a lesser amplitude is transmitted proportional to the ordinate of the intersection of spectrum 43 with the filter band 49. Since the switch 21 operates at 25 c.p.s., a signal amplitude-modulated at 25 c.p.s. is applied from the filter to the detector 37. The detector demodulates the signal and applies the demodulated 25 c.p.s. signal to the low-pass filter 38. This filter removes higher frequencies and applies the 25 c.p.s. signal to the phase detector 39. Its output consists of direct current having an amplitude representing the degree of non-congruence of the right-side skirt of the spectra 43 and 48, FIG. 4, and a polarity in accordance with which spectrum signal transmitted by the filter is the larger. This error signal output is applied to the integrator 41. When positive, it causes the integrator output direct potential to increase and when negative to decrease. When zero, the integrator output is constant.

Figure 5:
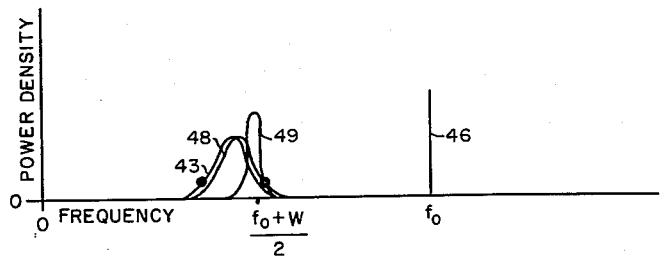

The integrator output is applied to control the output frequency of oscillator 17 and also to control the resonant frequency of filter 26. The control ratio is such that the relation of Equation 1 is secured throughout the range of adjustment. The phase reference potential applied to the phase detector is so phased that, when the lower side band spectrum 48 has a higher frequency than the Doppler spectrum 43, the frequency of oscillator 17 is reduced and the resonant frequency of the filter is also reduced. When, however, the Doppler spectral frequency is higher than the lower side band frequency, the frequencies of the oscillator 17 and filter 26 are increased. When a loop null has been approximately achieved the frequency graph will appear as shown in FIG. 5, with the two spectra 43 and 48 substantially congruent and the filter spectrum 49 at the 3 db level of the right sides of the spectra. The 25 c.p.s. error signal will be very small and the integrator output level will be almost constant.

Figure 6:
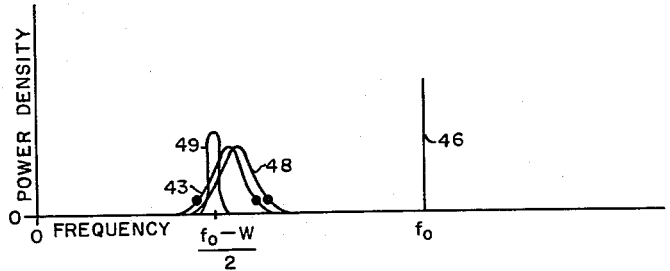

The relation of the filter transmission frequency to the oscillator frequency can just as well be represented by $$f_F = \frac{f_0 - w}{2} \qquad (2)$$

and by the graph of FIG. 6, as by Equation 1 and FIG. 5.

It may now be clearly seen by an inspection of FIG. 5 that any change in the filter transmission band frequency, between the limits of the peak and bottom of one side of the Doppler spectrum, will affect the error signal amplitude by only a trivial amount. Therefore, whether the filter transmission frequency is in error because of manufacturing tolerances or because of the effect of a change of temperature upon filter components, no error is introduced into the frequency tracker's measurement of the Doppler central frequency.

It also is obvious that filter characteristic asymmetry will not affect the accuracy of measurement of frequency by the frequency tracker, since the Doppler frequency measured does not depend on the accuracy of the filter frequency, as it does in most frequency trackers.

What is claimed is:

1. A frequency tracker for tracking the frequency of a changeable frequency input signal comprising, a modulator, means for impressing said input signal upon said modulator, means for impressing an alternating voltage upon said modulator, an adjustable filter having a transmission band frequency adjusted to substantially one-half of the frequency of said alternating voltage, means for alternately impressing the output of said modulator and said input signal upon said adjustable filter, and means responsive to the output of said filter for adjusting the frequency of said alternating voltage to twice that of said changeable frequency input.

2. A coincident frequency tracker comprising, a mixer-modulator, means applying thereto an electrical signal having a frequency spectrum which is to be tracked, an oscillator connected to said mixer-modulator, an adjustable band-pass filter, means adjusting said adjustable band-pass filter to a transmission frequency substantially one-half of the frequency of said oscillator, means applying the output of said mixer-modulator and said electrical signal alternately to said adjustable band-pass filter, a detector and phase detector connected to said adjustable band-pass filter to produce an error signal, means integrating said error signal to produce a control signal and means applying said control signal to control said oscillator frequency whereby the spectra transmitted by said adjustable band-pass filter in alternation are adjusted toward equal amplitude and said error signal is reduced in amplitude.

3. A frequency tracker for tracking the frequency of a changeable frequency input signal comprising, a modulator, means for impressing said input signal upon said modulator, means for impressing an alternating voltage upon said modulator, a band-pass filter, means for alternately impressing said input signal and the output of said modulator upon said filter, means for adjusting the pass-band frequency of said filter to substantially one-half of the frequency of said alternating voltage, and means responsive to the output of said filter for adjusting the frequency of said alternating voltage to twice that of said input signal.

4. A frequency tracker for tracking the frequency of a changeable frequency input signal spectrum comprising, a modulator, means for impressing said input signal spectrum upon said modulator, means for impressing an alternating voltage upon said modulator, an adjustable band-pass filter, means for alternately impressing said input signal and the output of said modulator upon said filter, means for adjusting the pass-band center frequency of said filter to a frequency differing by one-half of the width of said spectrum from one-half of the frequency of said alternating voltage, and means responsive to the output of said filter for adjusting the frequency of said alternating voltage to equal twice the center frequency of said input signal spectrum.

5. A frequency tracker comprising, an input circuit applying a changeable frequency signal spectrum to a modulator, means for impressing an alternating current upon said modulator, an adjustable band-pass filter, means for impressing at a selected rate of alternation said input signal spectrum and the output of said modulator upon said filter, means responsive to the output of said filter for adjusting the center of the pass-band thereof to a frequency differing by one-half of said signal spectrum width from one-half of the frequency of said alternating current, demodulating means for recovering the selected rate envelope of the output of said filter, and means responsive to the output of said demodulating means for adjusting the frequency of said alternating current to equal twice the center frequency of said input signal spectrum.

6. A frequency tracker comprising, an input circuit applying a changeable frequency signal spectrum to a modulator, means for impressing an alternating current upon said modulator, an adjustable band-pass filter, means for impressing at a selected rate of alternation said input signal spectrum and the output of said modulator upon said filter, demodulating means for recovering the selected rate envelope of the output of said filter, and means responsive to the output of said demodulating means for adjusting the pass-band center frequency of said filter to a frequency differing by one-half of the width of said spectrum from one-half of the frequency of said alternating current and for adjusting the frequency of said alternating current to twice the center frequency of said input signal spectrum.

7. An automatic signal frequency tracker comprising, a modulator having a changeable signal imposed thereon, said signal being composed of a band of frequencies having a center frequency, an oscillator generating a heterodyning signal having twice the frequency of said center frequency plus an erratum frequency, said heterodyning signal being impressed on said modulator to produce a lower side band frequency signal output, an adjustable discriminator having said lower side band frequency signal and said changeable signal impressed thereon and producing therefrom an error signal representative of said erratum frequency, means integrating said error signal and producing therefrom a control signal and means for controlling said oscillator by said control signal whereby a closed loop is formed which brings said lower side band frequency signal to the frequency of said changeable signal and reduces said erratum frequency to zero.

8. An automatic coincident signal frequency tracker comprising, a modulator having a changeable signal frequency band to be tracked imposed thereon, an oscillator generating a heterodyning signal having twice the frequency of the center of said frequency band plus an erratum frequency, said heterodyning signal being impressed on said modulator whereby the output thereof comprises a plurality of side band frequency signals, discriminator means including an adjustable resonant filter having said side band frequency signals and said changeable signal frequency band impressed thereon in alternation, said discriminator means producing an error signal whose amplitude is representative of said erratum frequency, means for integrating said error signal to produce a control signal and means controlling both said adjustable resonant filter and said oscillator whereby a closed loop is formed reducing said error signal to zero and making equal the frequency of the lower side band signal of said plurality of side band frequency signals and said changeable signal frequency band.

9. An automatic coincident signal frequency tracker comprising, a modulator having impressed thereon a changeable signal frequency spectrum to be tracked, an oscillator generating a heterodyning signal having twice the frequency of the center of said spectrum plus an erratum frequency, means impressing said heterodyning signal on said modulator, a low frequency timing rate generator, a band-pass filter having an adjustable center frequency, means alternately impressing on said filter at said timing rate said signal spectrum and the output of said modulator, an amplitude detector, means impressing thereon said filter output to form a demodulated signal at said timing rate having an amplitude representative of said erratum frequency, a phase detector connected to said timing rate generator as phase reference, means applying said demodulated signal to said phase detector to generate a direct current error signal having an amplitude representing said erratum frequency and a polarity representing the error sense thereof, an integrator means applying said direct current error signal to said integrator to form a control signal potential, means applying said control signal potential to control said oscillator and reduce said erratum frequency to zero, and means applying said control signal potential to adjust the center transmissibility frequency of said band-pass filter to a frequency differing by one-half of the width of said changeable signal spectrum from one-half of the frequency of said oscillator.

References Cited in the file of this patent

UNITED STATES PATENTS

| | | |
|---|---|---|
| 2,424,833 | Korman | July 29, 1947 |
| 2,640,106 | Wilson et al. | May 26, 1953 |
| 2,753,524 | Newsom | July 3, 1956 |
| 2,866,090 | Sherr | Dec. 23, 1958 |
| 2,896,074 | Newsom et al. | July 21, 1959 |